No. 872,774. PATENTED DEC. 3, 1907.
C. P. A. VAN FERLS & J. M. KNEELAND.
MOTOR CAR.
APPLICATION FILED MAY 24, 1907.

Witnesses:

Inventors,
CORNELIS PIETER ANEMAET VAN FERLS and
JOSEPHINE MARION KNEELAND,
By their Attorney

UNITED STATES PATENT OFFICE.

CORNELIS PIETER ANEMAET VAN FERLS AND JOSEPHINE MARION KNEELAND, OF NEW YORK, N. Y.

MOTOR-CAR.

No. 872,774.

Specification of Letters Patent.

Patented Dec. 3, 1907.

Application filed May 24, 1907. Serial No. 375,505.

*To all whom it may concern:*

Be it known that we, CORNELIS PIETER ANEMAET VAN FERLS, a subject of the Queen of the Netherlands, and JOSEPHINE MARION KNEELAND, a citizen of the United States of America, both residing in the borough of Manhattan, city and State of New York, United States of America, have invented a new and useful Motor-Car; and we do hereby declare the following to be a full, clear, and exact description of the same.

Our present invention relates to motor cars, and especially to the construction of the frame which supports the body of the car, and is particularly useful in connection with gasolene vehicles.

The objects of our invention are to provide a motor car with a supporting frame which shall, among other advantages, permit the car to rest quite low, to secure extreme traction effect, and to have its center of gravity lower than motor cars heretofore made, without reducing the clearance of the car, while preventing vibration and rocking of the car body, and which shall protect the fly-wheel of the engine.

Figure 1:
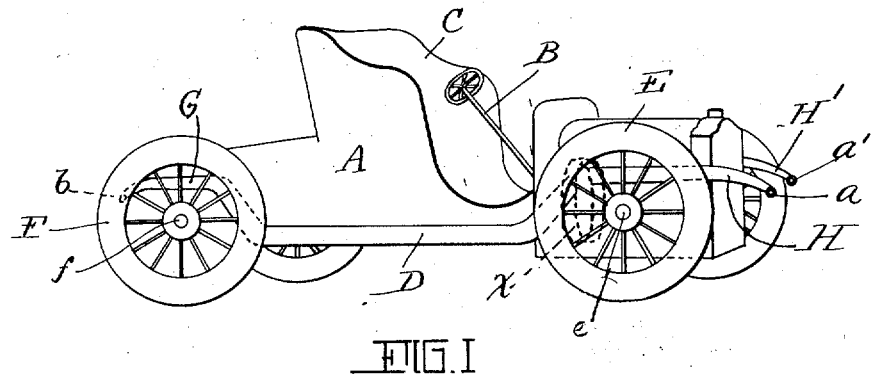
Figure 2:
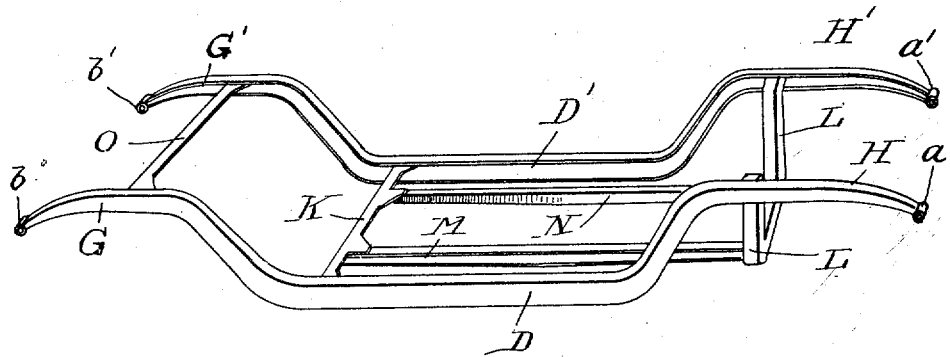

In the accompanying drawings, Figure 1 is a perspective view of an automobile embodying our improvements, and Fig. 2 is a perspective view of the new form of supporting frame preferably employed, the supplementary frame being also shown.

A indicates a car-body, the drawing showing one having a steering wheel B, front seat C, and running wheels E and F. The shape, construction, fittings and driving mechanism may be any desired.

D and $D^1$ are the opposite side frame members of the supporting or body frame for a car. This frame differs from those previously used in having the side frame members D and $D^1$ depressed midway of their ends or between the front and rear axles of the car. In the form shown in the drawings, the depressed parts referred to may be said to constitute the main portions of the pressed steel side channels usually employed as the side frames. Near their ends the members D and $D^1$ are arched so as to pass above the front axle $e$ and the rear axle $f$, and the extremities G, $G^1$, H, $H^1$, of both members are bent downwardly and form spring supports $b$, $b^1$, $a$, $a^1$.

We do not desire to be understood as requiring the side frame members D and $D^1$ to be depressed any fixed distance relatively to the ends of the side frame members, but we prefer that such depressed parts shall extend below both the front and the rear axles, and, better still, below the lower edge of the fly-wheel, X, indicated by dotted lines in Fig. 1, or below the other parts of the mechanism of the car. In the latter instance, the fly-wheel or other part of the mechanism, will be protected, more especially when a supplemental frame (for supporting an engine, or for other purpose) is used and placed between and connected with both members D and $D^1$. Such a supplemental frame is shown, with some detail in Fig. 2, and may consist of a rearward cross-bar K connected with the side frame members, where depressed, a bent forward cross-bar or stirrup L also connected with the side frame members forwardly of their depressed parts, and longitudinal beams or bars M and N which are preferably in the same plane with and substantially parallel with the depressed portions of the side frame members and extend forwardly beyond such depressed portions.

As will be seen in Fig. 1, the result of mounting a motor car-body upon side frame members of the kind before described, is that the center of gravity of the car is very low, below those parts of said frame members which are above the axles. This lowering of the car-body, we have found, substantially prevents the vibrations and rocking of the car-body, while the clearance of the car is not reduced as compared with cars which use unbent side frame members.

We claim:

1. A car-body supporting frame for a motor car and comprising opposite side frame members each of which is depressed midway of its length, and a supplementary frame provided with a rearward cross-bar connected with said side frame members where depressed and provided with a downwardly-bent forward cross-bar connected with such members above said depressed parts, and longitudinal bars forming part of the supplementary frame and disposed in a plane substantially parallel with the depressed parts of the side frame members and connected with both cross-bars.

2. A car-body supporting frame for a motor car and comprising opposite side frame members each of which is depressed midway of its length, and a supplementary frame disposed between and connected with said side frame members and substantially parallel with and extending forwardly of the depressed parts of the latter.

3. In a motor car, a car-body supporting frame comprising opposite side-frame members each of which is depressed midway of its length, and a supplementary frame comprising longitudinal bars disposed between said side frame members, the upper part of the depressed portions of the side-frame members being substantially in the same plane as the aforesaid longitudinal bars of the supplementary frame.

In testimony whereof, we have signed our names to this specification in the presence of two subscribing witnesses.

CORNELIS PIETER ANEMAET VAN FERLS.
JOSEPHINE MARION KNEELAND.

Witnesses:
WM. H. BERRIGAN,
J. H. HOVING.